United States Patent
Harada

(10) Patent No.: US 7,615,952 B2
(45) Date of Patent: Nov. 10, 2009

(54) ELECTRIC MOTOR DRIVING DEVICE, AND AIR CONDITIONER USING THE SAME

(75) Inventor: Kazuhiro Harada, Shiga (JP); Chisumi Harada, legal representative, Shiga (JP)

(73) Assignee: Panasonic Corporation, Osaka (JP)

( * ) Notice: Subject to any disclaimer, the term of this patent is extended or adjusted under 35 U.S.C. 154(b) by 343 days.

(21) Appl. No.: 11/574,016

(22) PCT Filed: Aug. 24, 2005

(86) PCT No.: PCT/JP2005/015312

§ 371 (c)(1),
(2), (4) Date: Feb. 21, 2007

(87) PCT Pub. No.: WO2006/025233

PCT Pub. Date: Mar. 9, 2006

(65) Prior Publication Data

US 2009/0115364 A1      May 7, 2009

(30) Foreign Application Priority Data

Sep. 2, 2004   (JP)   .............................. 2004-255227
Feb. 28, 2005  (JP)   .............................. 2005-052827

(51) Int. Cl.
*H02P 1/00*   (2006.01)
(52) U.S. Cl. .................... 318/445; 318/432; 318/366
(58) Field of Classification Search ................ 318/432, 318/563, 434, 366, 445
See application file for complete search history.

(56) References Cited

U.S. PATENT DOCUMENTS

| | | | | |
|---|---|---|---|---|
| 4,897,630 A | * | 1/1990 | Nykerk | 340/426.25 |
| 5,260,684 A | * | 11/1993 | Metzmaker | 340/457.1 |
| 2005/0241883 A1 | * | 11/2005 | Zuzuly et al. | 187/277 |

FOREIGN PATENT DOCUMENTS

| | | |
|---|---|---|
| JP | 7-284289 | 10/1995 |
| JP | 9-294392 | 11/1997 |
| JP | 2001-286179 | 10/2001 |
| JP | 2004-23809 | 1/2004 |
| JP | 2004-229430 | 8/2004 |

* cited by examiner

*Primary Examiner*—Rina I Duda
(74) *Attorney, Agent, or Firm*—Pearne & Gordon LLP

(57) ABSTRACT

Disclosed is a motor-driving device capable of protecting an inverter from breakdown. First current-protecting section retains reference voltage value Vref1 as a preset value. If the current to be fed into inverter exceeds value Vref1, first current-protecting section shuts off the output of driver and outputs a first warning to driving-signal generator to shut off generating driving signals. This protects inverter from breakdown. Second current-protection section retains reference voltage value Vref2 that is smaller than value Vref1. If the detected current exceeds value Vref2, second current-protecting section outputs a second warning. Receiving the second warning, driving-signal generator immediately stops generating driving signals; however, it resumes output of driving signals after no longer receiving second warning. The structure above protects inverter from breakdown without frequent stops of brushless motor.

2 Claims, 3 Drawing Sheets

Motor comes to a stop

ELECTRIC MOTOR DRIVING DEVICE, AND AIR CONDITIONER USING THE SAME

This application is a U.S. National Phase Application of PCT International Application PCT/JP2005/015311.

TECHNICAL FIELD

The present invention relates to a motor-driving device for driving an electric motor, such as a brushless DC motor mainly employed for an air conditioner, at a given rotation speed.

BACKGROUND ART

In recent years, from the viewpoint of environmental protection, a power-saving operation has been much needed in a device for driving a motor, such as a fan motor employed for an air conditioner. Under the circumstances, as an effective power-saving technique, an inverter that enables to drive a highly efficient motor, such as a brushless DC motor, at a given frequency has been widely used. Besides, for size reduction, such a driving device employs an IC in which an inverter is integrated to a driver for transmitting driving signals and an overcurrent protection device.

FIG. 5 shows a conventional system structure for driving a motor that employs the aforementioned type of IC. The motor-driving device of FIG. 5 contains IC 52, fixed resistor 54, driving-signal generator 55, inverter 56, driver 57 and first current-protecting section 58. Brushless motor 53 is controlled by IC 52. IC 52 is formed of inverter 56, driver 57 and first current-protecting section 58. Inverter 56 contains three series-circuits each of which has a pair of switching elements arranged on the upstream and on the downstream with respect to the current flow. DC power supply 51 feeds the three series-circuits with DC voltage via fixed resistor 54.

Brushless motor 53 contains three-phase windings that are Y-connected with the neutral point at the center. Driving-signal generator 55 generates PWM signals (i.e., signals for pulse width modulation) to operate brushless motor 53 at an intended speed. Driver 57 amplifies the PWM signals to control inverter 56.

To protect inverter 56 from breakdown caused by overcurrent, first current-protecting section 58 detects voltage across fixed resistor 54 that is connected between the negative side of DC power supply 51 and inverter 56. Reference voltage value Vref1 is preset in first current-protecting section 58. If the detected voltage exceeds reference voltage value Vref1, first current-protecting section 58 shuts off the output of driver 57 and outputs a warning of abnormal conditions. Upon receiving the warning, driving-signal generator 55 stops generating the PWM signals. If once the warning is received, driving-signal generator 55 maintains the shut-off state and generates no more signals.

With the circuit structure above, the motor-driving device controls brushless motor 53. Such a structure described above is disclosed, for example, in Japanese Patent Unexamined Publication No. H09-294392.

In the conventional driving method, however, current-value setting involves following inconveniencies. When the current value of inverter 56 is determined under the assumption that overcurrent occurs once, a continuous flow or a continual flow of current—even when the current value measures lower the predetermined value—often overheats inverter 56, resulting in breakdown. To avoid the overheating, it becomes necessary to use an inverter being more tolerant of heat, or to fix a heatsink with a sufficient capacity to the inverter. This has invited increase in size and cost of the structure. On the other hand, suppose that the current is set at a value in consideration of thermal breakdown caused by the continuous or continual flow of current. In this case, the driving-signal generator 55 becomes sensitive to an overcurrent, which temporarily occurs once or several times in starting-up or accelerating operation of the motor and therefore no risk of thermal breakdown, and shuts off the output. From this reason, the motor has often come to a stop.

SUMMARY OF THE INVENTION

The present invention addresses the problems above. The invention has as its object to provide a compact and low-cost motor-driving device capable of protecting an inverter from overcurrent without frequent stops of a motor.

To attain the object, the motor-driving device of the present invention contains an inverter that drives a three-phase motor; a driver that amplifies a driving signal and sends it to the inverter; a first current-protecting section; a second current-protecting section; and a driving-signal generator. The first current-protecting section detects the current to be fed into the inverter by an external resister connected to the bus line of the inverter. If the detected value exceeds a predetermined first reference value, the first current-protecting section shuts off the output of the driver and outputs a first warning to the driving-signal generator. If the detected value exceeds a predetermined second reference value that is smaller than the first reference value, the second current-protecting section outputs a second warning to the driving-signal generator. Upon receiving the first warning, the driving-signal generator immediately stops generating driving signals and remains the shut-off state even if the driving-signal generator no longer receives first warning. On the other hand, receiving the second warning, the driving-signal generator immediately stops generating driving signal; however, the driving-signal generator resumes the output of the driving signals at that point in time when no longer receiving second warning.

As another structure of the present invention, the motor-driving device contains an inverter that drives a three-phase motor; a driver that amplifies a driving signal and sends it to the inverter; a first current-protecting section; a second current-protecting section; and a driving-signal generator. If the detected value exceeds a predetermined first reference value, the first current-protecting section shuts off the output of the driver and outputs a first warning to the driving-signal generator. If the detected value exceeds a predetermined second reference value that is greater than the first reference value, the second current-protecting section outputs a second warning to the driving-signal generator. Receiving the first warning, the driving-signal generator immediately stops generating driving signal; however, the driving-signal generator resumes the output of the driving signals at that point in time when no longer receiving first warning. On the other hand, receiving the second warning, the driving-signal generator immediately stops generating driving signals and remains the shut-off state even if the driving-signal generator no longer receives second warning.

Employing the structures above provides a compact and low-cost motor-driving device capable of protecting an inverter from overcurrent without frequent stops of a motor.

REFERENCE MARKS IN THE DRAWINGS

Figure 1:
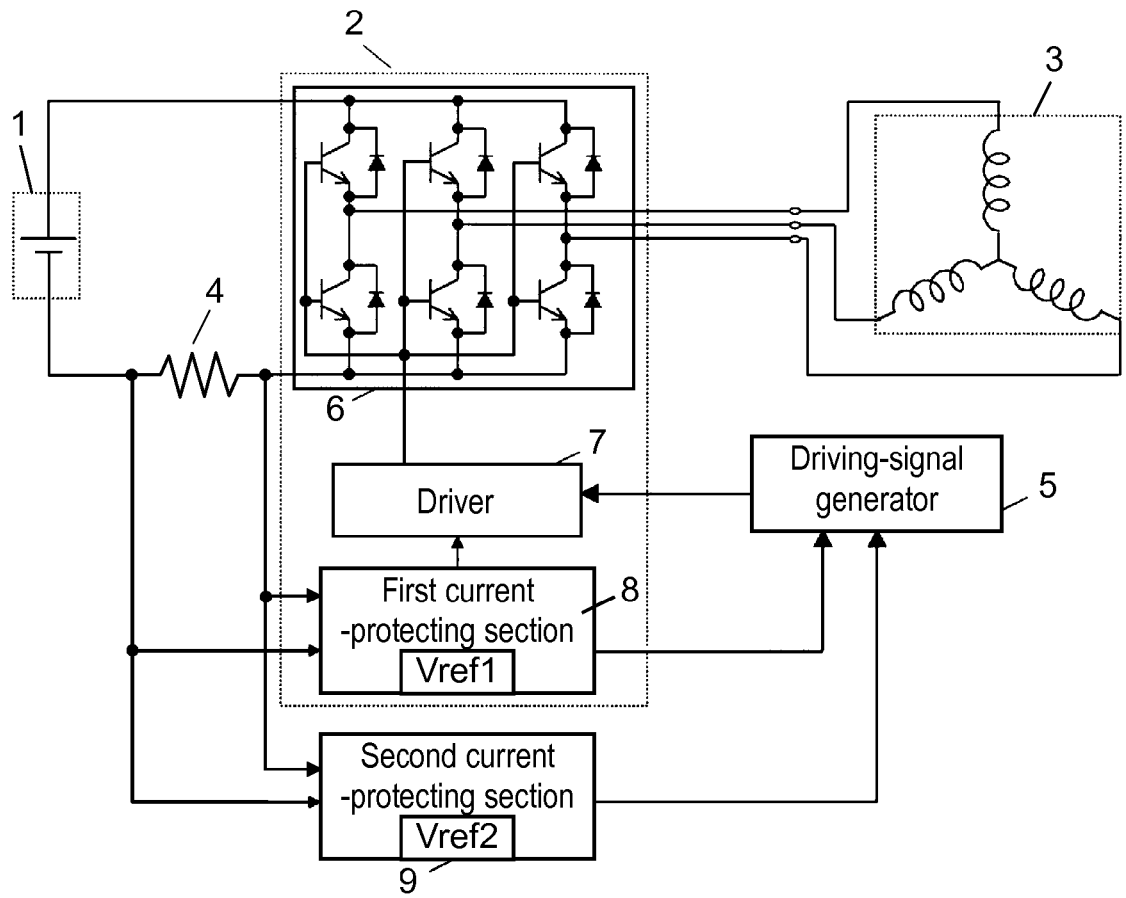
FIG. 1 is a block diagram showing the structure of the motor-driving device in accordance with a first and a second exemplary embodiments of the present invention.

1 DC power supply
2 IC.
3 brushless motor
4 fixed resistor
5 driving-signal generator
6 inverter
7 driver
8 first current-protecting section
9 second current-protecting section

DETAILED DESCRIPTION OF THE PREFERRED EMBODIMENTS

First Exemplary Embodiment

Hereinafter will be described the structure of the present invention of the first exemplary embodiment with reference to accompanying drawings. FIG. 1 is a block diagram showing the structure of the first exemplary embodiment. The motor-driving device of the embodiment contains IC 2, fixed resistor 4, driving-signal generator 5, inverter 6, driver 7, first current-protecting section 8 and second current-protecting section 9. Brushless motor 3 is controlled by IC 2. IC 2 is formed of inverter 6, driver 7 and first current-protecting section 8. Inverter 6 contains three series-circuits each of which has a pair of switching elements arranged on the upstream and on the downstream with respect to the current flow. DC power supply 1 feeds the three series-circuits with DC voltage via fixed resistor 4.

Brushless motor 3 contains three-phase windings that are Y-connected with the neutral point at the center. Driving-signal generator 5 generates PWM signals to operate brushless motor 3 at an intended speed. Driver 7 amplifies the PWM signals to control inverter 6.

Figure 2:
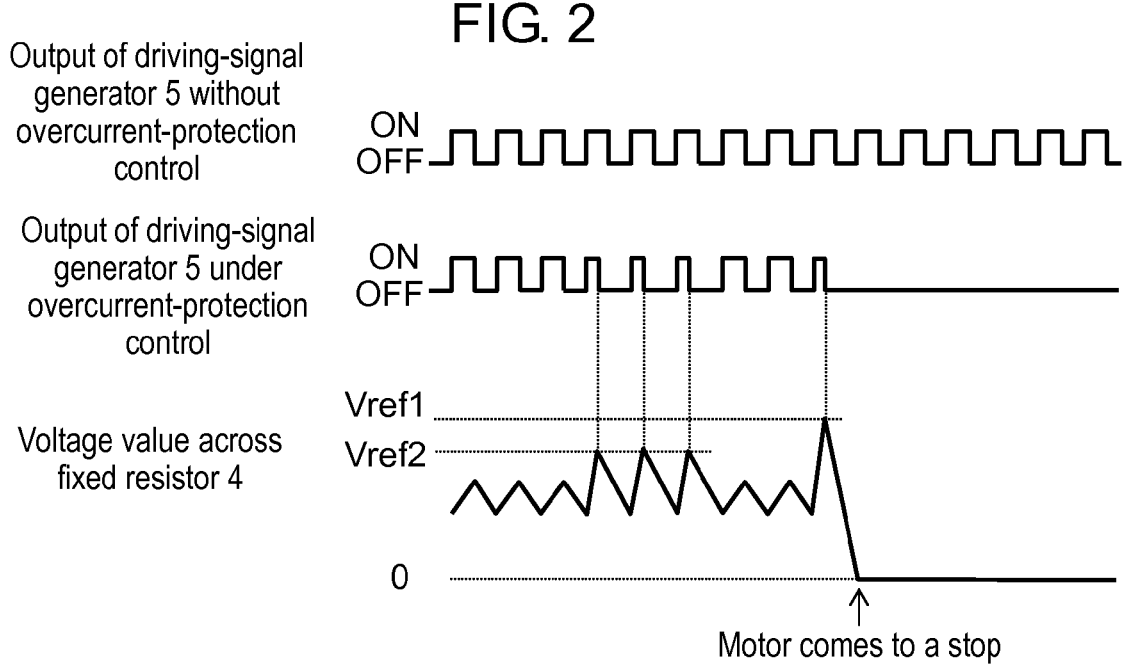
FIG. 2 illustrates output of driving-signal generator 5 for protecting an inverter from overcurrent in accordance with the first exemplary embodiment.

Next will be described protection of the inverter from breakdown with reference to FIG. 2. The current to be fed into inverter 6 is detected as a voltage value obtained across fixed resistor 4 that is connected between inverter 6 and the negative side of DC power supply 1. First current-protecting section 8 has reference value Vref1 as a preset value. If the detected voltage value exceeds value Vref1, first current-protecting section 8 shuts off the output of driver 7 and outputs a first warning to driving-signal generator 5. Upon receiving the first warning, driving-signal generator 5 immediately stops generating driving signals and remains the shut-off state even if the driving-signal generator no longer receives first warning. Inverter 6 is thus protected from breakdown.

On the other hand, second current-protecting section 9 has reference value Vref2 that is smaller than reference value Vref1. If the voltage value across fixed resistor 4 exceeds value Vref2, second current-protecting section 9 outputs a second warning to driving-signal generator 5. Receiving the second warning, driving-signal generator 5 immediately stops generating driving signals. After that, driving-signal generator 5 resumes the output of the driving signals at that point in time when no longer receiving second warning.

With the structure above, the motor-driving device protects inverter 6 from breakdown without frequent stops of the brushless motor.

Second Exemplary Embodiment

Figure 3:
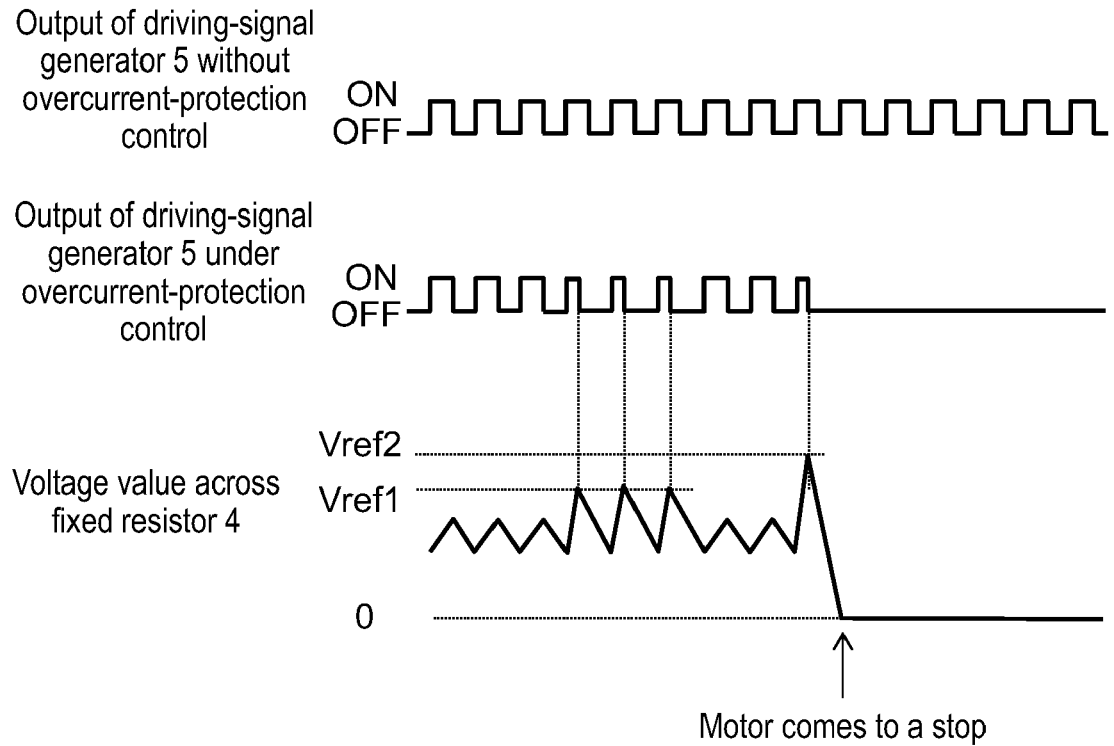
FIG. 3 illustrates output of driving-signal generator 5 for protecting an inverter from overcurrent in accordance with the second exemplary embodiment.

Next will be described the structure for protecting an inverter in accordance with the second exemplary embodiment with reference to FIG. 1 and FIG. 3. The motor-driving device shown in FIG. 1 has a structure the same as that described in the first exemplary embodiment, and the description thereof will be omitted. The current to be fed into inverter 6 is detected as a voltage value obtained across fixed resistor 4 that is connected between inverter 6 and the negative side of DC power supply 1. First current-protecting section 8 has reference value Vref1 as a preset value. If the detected voltage value exceeds value Vref1, first current-protecting section 8 shuts off the output of driver 7 and outputs a first warning to driving-signal generator 5. Upon receiving the first warning, driving-signal generator 5 immediately stops generating driving signals. After that, driving-signal generator 5 resumes the output of the driving signals at that point in time when no longer receiving first warning. With the structure above, the motor-driving device protects inverter 6 from breakdown without frequent stops of the brushless motor.

On the other hand, second current-protecting section 9 has reference value Vref2 that is greater than reference value Vref1. If the voltage value across fixed resistor 4 exceeds value Vref2, second current-protecting section 9 outputs a second warning to driving-signal generator 5. Upon receiving the second warning, driving-signal generator 5 immediately stops generating driving signals and remains the shut-off state even if the driving-signal generator no longer receives second warning. Inverter 6 is thus protected from breakdown.

Such structured motor-driving device reliably protects the inverter from breakdown without frequent stops of a motor. The structure above also contributes to reduction in size and cost of the motor-driving device.

Third Exemplary Embodiment

Figure 4:
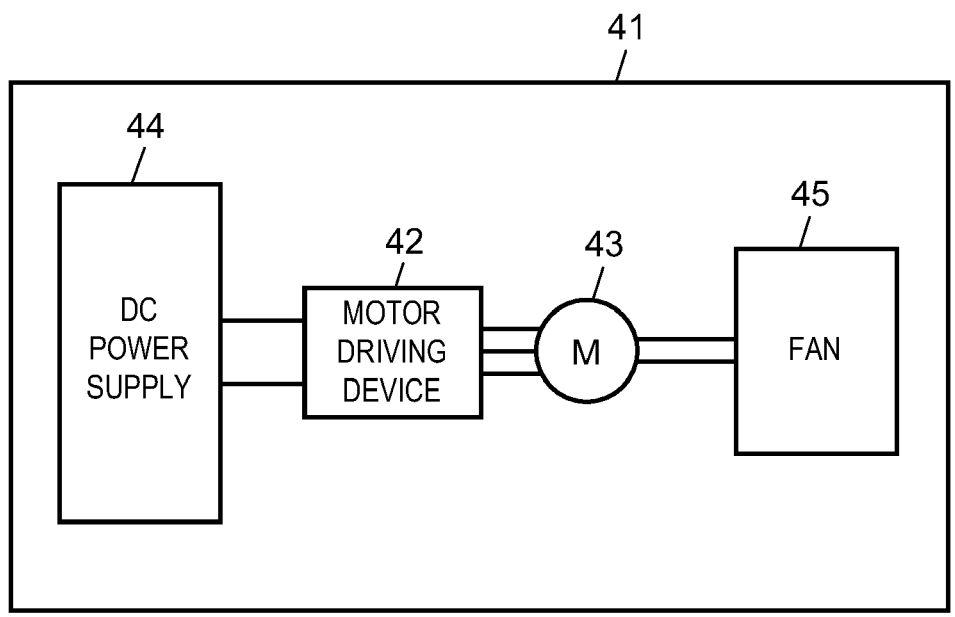
FIG. 4 is a block diagram of an air conditioner containing the motor-driving device of the present invention.
Figure 5:
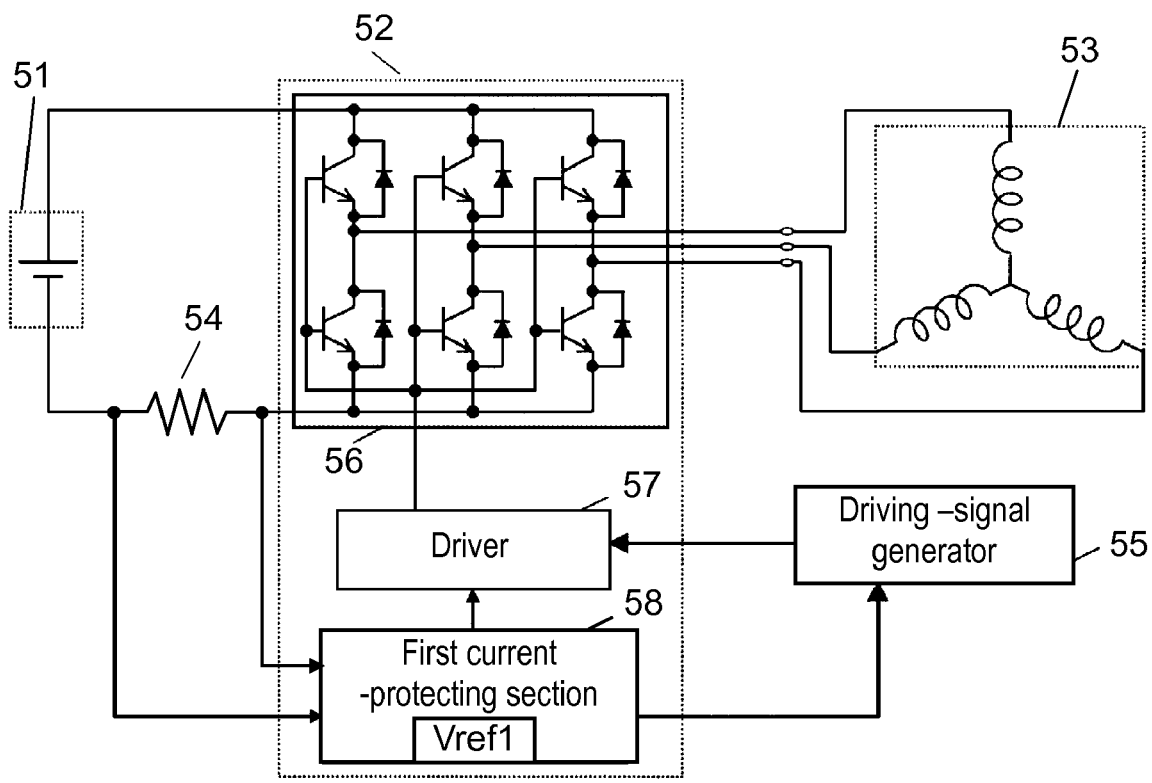
FIG. 5 is a block diagram showing a structure of a conventional motor-driving device.

FIG. 4 is a block diagram of an air conditioner containing the motor-driving device of the present invention. Air conditioner 41 in FIG. 4 contains DC power supply 44, motor-driving device 42, brushless motor 43 and fan 45. DC power supply 44 supplies motor-driving device 42 with electric power. Motor-driving device 42 controls the amount of airflow of fan 45 through brushless motor 43.

By virtue of the overcurrent protection, motor-driving device 42 of the present invention maintains stable operations without frequent stops of fan 45 even if load on fan 45 in air conditioner 41 increases as ambient temperature changes.

INDUSTRIAL APPLICABILITY

The motor-driving device of the present invention eliminates the need for using an inverter being more tolerant of heat or for fixing a heatsink with a sufficient capacity to an inverter. The advantage above contributes to reduction in size and cost of the structure. Besides, the motor-driving device reliably protects the inverter from breakdown without frequent stops of the motor. The structure is therefore suitable for a motor-driving device that drives a motor, such as a brushless DC motor, at a given rotation speed.

The invention claimed is:

1. A motor-driving device comprising:

an inverter that drives a three-phase motor;

a driver that amplifies a driving signal and sends an amplified driving signal to the inverter;

a first current-protecting section that detects current to be fed into the inverter by an external resister connected to a bus line of the inverter, and shuts off output of the driver and outputs a first warning if the detected current value exceeds a predetermined first reference value;

a second current-protecting section that outputs a second warning if the detected current value exceeds a predetermined second reference value that is smaller than the first reference value; and a driving-signal generator that generates the driving signal, wherein, 1) when the driving-signal generator receives the first warning from the first current-protecting section, the driving-signal generator stops generating the driving signal and remains to stop generating the driving signal even after the driving-signal generator no longer receives the first warning, 2) when the driving-signal generator receives the second warning from the second current-protecting section, the driving-signal generator stops generating the driving signals, however, the driving-signal generator resumes output of the driving signals at a point in time when no longer receiving the second warning, and wherein the first current-protecting section and the second current-protecting section work independently.

2. An air conditioner comprising: the motor-driving device of claim 1;

the motor driven by the inverter; and a fan controlled by the motor.

* * * * *

UNITED STATES PATENT AND TRADEMARK OFFICE
CERTIFICATE OF CORRECTION

| | | |
|---|---|---|
| PATENT NO. | : 7,615,952 B2 | Page 1 of 1 |
| APPLICATION NO. | : 11/574016 | |
| DATED | : November 10, 2009 | |
| INVENTOR(S) | : Harada | |

It is certified that error appears in the above-identified patent and that said Letters Patent is hereby corrected as shown below:

In column 1, line 5, the PCT application should read PCT/JP2005/015312

In column 3, line 16, there should not be a period (.) after IC

Signed and Sealed this

Sixteenth Day of March, 2010

David J. Kappos
*Director of the United States Patent and Trademark Office*